Feb. 14, 1933.　　　K. G. STARK　　　1,897,444
PLOW FOR WETTING THE PLOWSHARE
Filed March 12, 1931
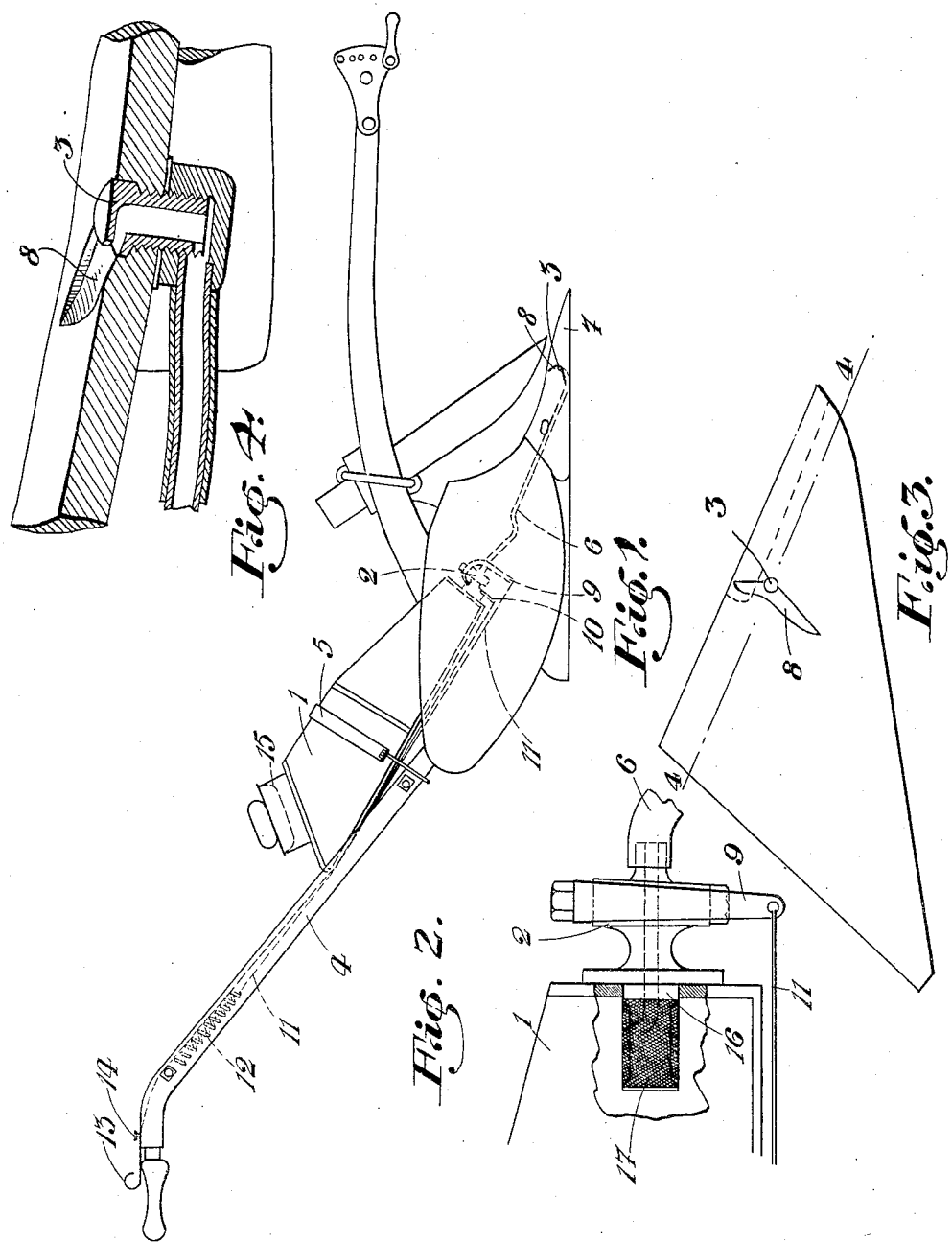
K. G. Stark
INVENTOR
By: Marks & Clerk
ATTYS.

Patented Feb. 14, 1933

1,897,444

UNITED STATES PATENT OFFICE

KARL GUNNAR STARK, OF SKYNNERSTAD, LOFTA, SWEDEN

PLOW FOR WETTING THE PLOWSHARE

Application filed March 12, 1931, Serial No. 522,105, and in Sweden March 14, 1930.

In practice it has proved to be a very heavy and hard work to plow a ground, which is stiff and hard, because the side surfaces of the plowshare go very harshly through the stiff, hard ground. Since long ago it has been desirable to remedy this drawback in some way, as, on plowing behind horses, the same have had to work very hard and on plowing after motor plows one has not been able to add as many plowshares, as one would have been able to do, if they had glided more easily through the ground.

The present invention relates to a device, by which this drawback is removed in a very simple and practical way.

Principally the device consists therein that the plowshare is wet with water from a water receptacle located on the plow, by which the ground surfaces near the plowshare become moist. It is commonly known that soil or clay becomes slippery, if it is somewhat wet, by which the plowshare glides much more easily through the ground.

The device is illustrated in the accompanying drawing.

Fig. 1 shows an embodiment of the entire device mounted onto a plow.

Fig. 2 is an elevational detail partly in section showing the water supply means, Fig. 3 is a fragmentary elevational detail showing the recess in the plowshare and a nozzle associated therewith, and Fig. 4 is an enlarged sectional detail on the line 4—4 of Fig. 2.

The device mainly consists of a water receptacle 1, a regulation tap 2 and nozzles 3. The water receptacle is mounted to the plow shafts 4 by means of a strap 5. A pipe 6 proceeds from the bottom of the receptacle 1, said pipe connecting a nozzle 3 with the receptacle. Immediately below the bottom of the receptacle 1 there is located the regulation tap 2, the pipe 6 being connected to said tap. The nozzle 3 is located adjacent to the point of the plowshare 7 and opens into a sector-shaped recess 8 of the plow-share. When on plowing the water is now let on from the receptacle 1, it flows out through the nozzle and, on account of the sector-shaped recess 8 of the plow-share and the movement of the plow, is spread along the whole surface of the plow-share and wets the cut surfaces of the plow furrows. The flowing quantity of water may be regulated by the tap 2, in order that a suitable quantity of water is always supplied. In order to facilitate the regulation of water when plowing the tap, having two regulation arms 9 and 10, is by means of these arms connected to a regulating member, which is mounted to the handle of the shafts 4. In the embodiment shown in the drawing this regulation is arranged so as to be semi-automatic, one regulation arm 9 of the tap being by means of a wire 11 or the like connected to a spring 12 mounted to the shafts, said spring aiming at keeping the tap open. The other regulation arm 10 is connected to a handle 13 or the like, which is mounted to the handles of the shafts 4. This handle is adapted to be locked in different positions by means of a screw device 14, by which the tap is more or less closed.

A strainer 15 is located in the refilling opening of the receptacle 1 in order to prevent impurities from coming into the receptacle. The tap 2 has an extension 16 running towards the receptacle, the outlet of the water being located at the middle of said extension. Around this extension there is located a filtering-cloth casing 17 in order to further secure that small impurities do not come in and choke up the pipe or the nozzle.

Many embodiments may, of course, be thought of, without necessarily departing from the principle falling within the scope of the invention. Thus, if desired, more than one nozzle may be located in the plow-share.

Having now described my invention, what I claim as new and desire to secure by Letters Patent is:

A device of the character described including in combination, a plowshare provided on its operative face with a sector shaped recess, a nozzle mounted on the plowshare and communicating with the recess, and means for supplying water to the nozzle.

In witness whereof I have hereunto signed my name.

KARL GUNNAR STARK.